(12) United States Patent
Fujita et al.

(10) Patent No.: US 8,051,977 B2
(45) Date of Patent: Nov. 8, 2011

(54) HYDROGEN STORAGE TANK

(75) Inventors: Katsuyoshi Fujita, Kariya (JP);
Hidehito Kubo, Kariya (JP); Daigoro Mori, Mishima (JP); Katsuhiko Hirose, Aichi-ken (JP); Norihiko Haraikawa, Mishima (JP)

(73) Assignees: Kabushiki Kaisha Toyota Jidoshokki, Aichi-Ken (JP); Toyota Jidosha Kabushiki Kaisha, Aichi-Ken (JP)

( * ) Notice: Subject to any disclaimer, the term of this patent is extended or adjusted under 35 U.S.C. 154(b) by 26 days.

(21) Appl. No.: 12/602,675

(22) PCT Filed: Jun. 5, 2008

(86) PCT No.: PCT/JP2008/060332
§ 371 (c)(1),
(2), (4) Date: Feb. 2, 2010

(87) PCT Pub. No.: WO2008/149917
PCT Pub. Date: Dec. 11, 2008

(65) Prior Publication Data
US 2010/0181213 A1 Jul. 22, 2010

(30) Foreign Application Priority Data
Jun. 6, 2007 (JP) ................................ 2007-150988

(51) Int. Cl.
*B65D 85/00* (2006.01)
(52) U.S. Cl. ........... 206/0.7; 165/162; 165/157; 29/428; 220/563; 220/564
(58) Field of Classification Search .................. 206/0.7; 220/562, 563, 564, 507, 586, 581; 165/157, 165/162, 163; 29/422, 455.1, 773, 801, 428
See application file for complete search history.

(56) References Cited

U.S. PATENT DOCUMENTS

| 3,837,527 | A | * | 9/1974 | Kutik et al. | 220/675 |
| 4,457,136 | A | * | 7/1984 | Nishizaki et al. | 62/46.2 |
| 4,504,530 | A | * | 3/1985 | Bliley | 428/36.1 |
| 5,564,587 | A | * | 10/1996 | Falk et al. | 220/501 |
| 6,691,889 | B1 | * | 2/2004 | Falk | 220/563 |
| 2004/0182869 | A1 | * | 9/2004 | Kubo et al. | 220/581 |
| 2005/0211573 | A1 | * | 9/2005 | Myasnikov et al. | 206/0.7 |

(Continued)

FOREIGN PATENT DOCUMENTS

GB    2030693    4/1980

(Continued)

OTHER PUBLICATIONS

English language Abstract of JP 4-243901, Sep. 1, 1992.

(Continued)

*Primary Examiner* — David Fidei
(74) *Attorney, Agent, or Firm* — Greenblum & Bernstein P.L.C.

(57) ABSTRACT

A hydrogen storage tank includes a tank main body, partition sections, and a hydrogen flow pipe. The hydrogen flow pipe prevents MH powder from passing through and permits hydrogen to pass through. The tank main body includes a hollow body portion having openings on opposite ends. Dome portions are joined to opening ends of the body portion. Partition sections are provided in the body portion so that first retaining chambers, which retain the MH powder, are defined in the body portion. Extended portions, which serve as second partition members, are provided in the dome portions to divide the space in the dome portions into second retaining chambers, which retain the MH powder.

10 Claims, 3 Drawing Sheets

U.S. PATENT DOCUMENTS

2006/0163261 A1* 7/2006 Sugiura et al. ............. 220/581
2006/0261073 A1   11/2006 Kanno

FOREIGN PATENT DOCUMENTS

| JP | 55-044192 | 3/1980 |
| JP | 58-099103 | 6/1983 |
| JP | 58-194702 | 11/1983 |
| JP | 4-243901 | 9/1992 |
| JP | 8-178463 | 7/1996 |
| JP | 9-042595 | 2/1997 |
| JP | 2004-100926 | 4/2004 |
| JP | 2005-061474 | 3/2005 |
| JP | 2005-240983 | 9/2005 |
| JP | 2006-029396 | 2/2006 |

OTHER PUBLICATIONS

English language Abstract of JP 55-044192, Mar. 28, 1980.
English language Abstract of JP 9-042595, Feb. 14, 1997.
English language Abstract of JP 2005-061474, Mar. 10, 2005.
English language Abstract of JP 8-178463, Jul. 12, 1996.
English language Abstract of JP 58-194702, Nov. 12, 1983.
English language Abstract of JP 58-099103, Jun. 13, 1983.
English language Abstract of JP 2006-029396, Feb. 2, 2006.
English language Abstract of JP 2004-100926, Apr. 2, 2004.
English language Abstract of JP 2005-240983, Sep. 8, 2005.
Mori et al., "High-pressure Metal Hydride Tank for Fuel Cell Vehicles", JSAE 20077268, SAE 2007-01-2011, pp. 560-564.

* cited by examiner

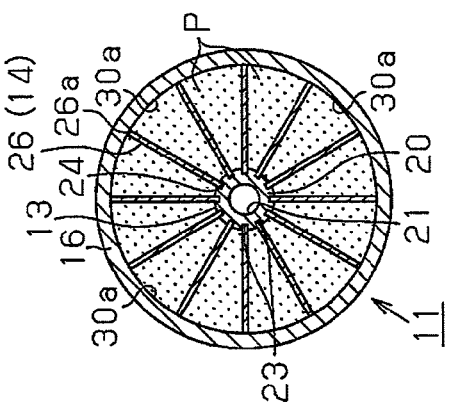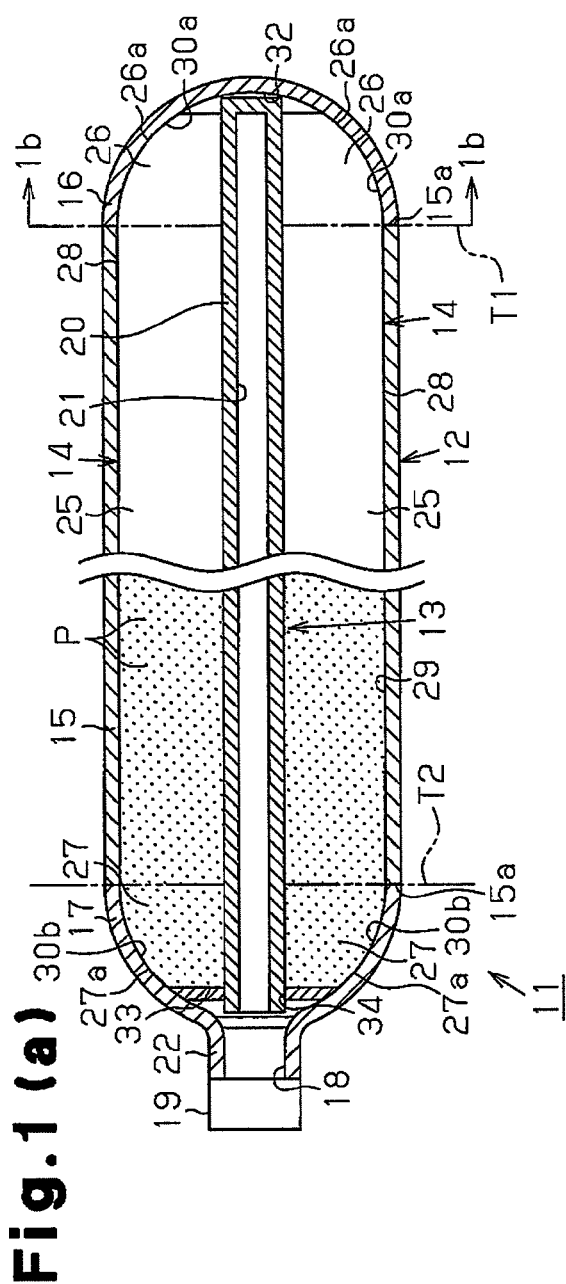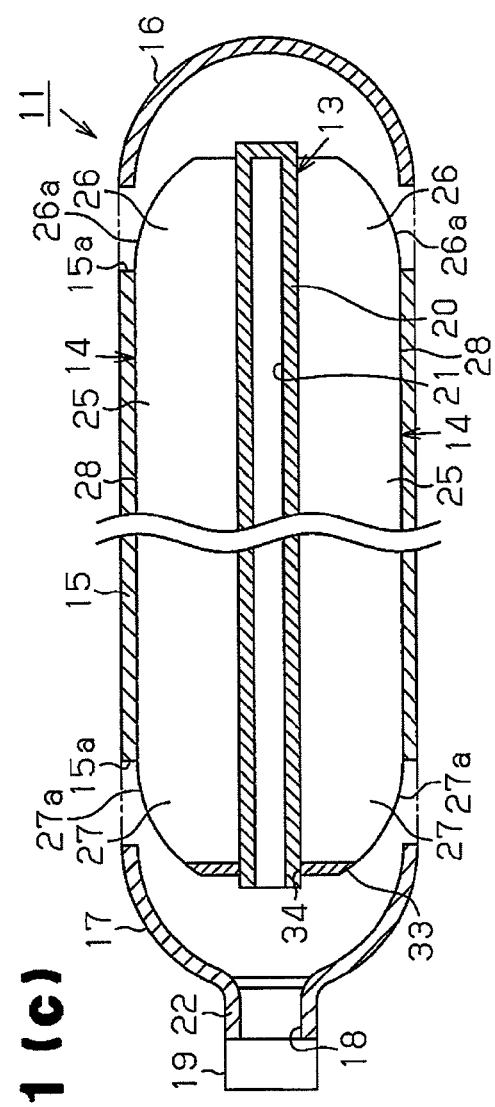

HYDROGEN STORAGE TANK

FIELD OF THE INVENTION

The present invention relates to a hydrogen storage tank that utilizes hydrogen absorbing metal.

BACKGROUND OF THE INVENTION

A hydrogen storage tank that retains powdered hydrogen absorbing metal (hereinafter, referred to as MH) has been proposed. In the hydrogen storage tank, the MH absorbs hydrogen for storage, and the hydrogen is released from the MH when in use. However, in such a hydrogen storage tank, if the MH is retained in the tank without being held, the MH settles and may be partially compacted. If the MH absorbs hydrogen and expands in this state, an excessive stress is locally generated in the tank and cause adverse effect on the tank.

Thus, a hydrogen storage tank 6 as shown in FIG. 4 has been proposed. The tank 6 is formed by a tank main body 1, which includes a tubular body portion 2 and dome portions 3, which are respectively attached to the opposite ends of the body portion 2. The space in the body portion 2 is divided into retaining chambers 4 by partition members 5 located in the body portion 2. In the hydrogen storage tank 6, MH 7 is separately retained in the retaining chambers 4, and separately settles in the retaining chambers 4. This prevents partial compaction of the MH 7 in the body portion 2.

An MH container as disclosed in Patent Document 1 has also been proposed as one type of hydrogen storage tank that prevents partial compaction of the MH. A honeycomb structure that includes cells filled with the MH is inserted in the container, and shock absorbers are provided at the upper and lower ends of the honeycomb structure. An aerofin is wound around the outside of the container. In the container, the MH is prevented from moving to one side by the honeycomb structure and the shock absorbers.

Patent Document 2 further proposes a pressure container liner configured by a tubular first liner component and a pair of second liner components, which close the openings at the opposite ends of the first liner component. A reinforcement wall is provided in the second liner components.

When a hydrogen storage tank is used as a fuel tank for a hydrogen engine or a fuel-cell vehicle, the size of the tank needs to be reduced while maintaining the amount of hydrogen that can be supplied. To do so, it is required to increase the proportion of a hydrogen filled region (MH filled region) in the hydrogen storage tank. The proportion of the hydrogen filled region (MH filled region) means the proportion of the region that can be filled with hydrogen (MH) in the entire internal region of the hydrogen storage tank. In the hydrogen storage tank that includes the dome portions 3 provided on opposite ends of the tubular body portion 2 as shown in FIG. 4, the space S in the dome portions 3 may be filled with the MH to increase the proportion of the hydrogen filled region. In this case, however, the MH filling the space S in the dome portions 3 settles, and could be partially compacted at the bottom of the dome portions 3. If the MH expands in the compacted state, an excessive stress is locally generated.

Also, in the MH container disclosed in Patent Document 1, shock absorbers are provided at the upper and lower ends of the honeycomb structure to prevent the MH to move to the ends of the container. Thus, the ends of the container cannot be filled with the MH. Thus, the proportion of the MH filled region cannot be increased in such an MH container.

Furthermore, in the pressure container liner disclosed in Patent Document 2, the reinforcement wall provided in the second liner components is a member provided to increase the pressure capacity against the force that acts in the lengthwise direction of the pressure container liner. That is, the reinforcement wall is not provided in order to divide the space in the second liner components. Thus, in the pressure container liner, it is not taken into consideration that when the second liner components are filled with the MH, the MH in the second liner components may settle and become partially compacted.

Patent Document 1: Japanese Laid-Open Patent Publication No. 2004-100926
Patent Document 2: Japanese Laid-Open Patent Publication No. 2005-61474

DISCLOSURE OF THE INVENTION

Accordingly, it is an objective of the present invention to provide a hydrogen storage tank that permits dome portions to be filled with MH, and prevents the MH in the dome portions from being partially compacted.

To achieve the above objective, the present invention provides a hydrogen storage tank including a sealable tank main body, a first partition member, a second partition member, and a hydrogen flow section. The tank main body includes a hollow body portion having openings on opposite ends and first and second end portions, which are provided on the opposite ends of the body portion, respectively. At least one of the first and second end portions is formed as a dome portion. The first partition member is located in the body portion. The first partition member divides the space in the body portion into first retaining chambers for retaining hydrogen absorbing metal. The second partition member is located in the dome portion. The second partition member divides the space in the dome portion into second retaining chambers for retaining hydrogen absorbing metal. The hydrogen flow section is located in the tank main body. The hydrogen flow section prevents the hydrogen absorbing metal from leaking to the outside of the tank main body, and permits hydrogen to flow between the inside and the outside of the tank main body.

BRIEF DESCRIPTION OF THE DRAWINGS

FIG. 1(a) is a schematic cross-sectional view illustrating a hydrogen storage tank according to a first embodiment of the present invention;
FIG. 1(b) is a cross-sectional view taken along line 1b-1b in FIG. 1(a);
FIG. 1(c) is a schematic cross-sectional view illustrating the hydrogen storage tank in a state where the dome portions are separate from the body portion.

DETAILED DESCRIPTION OF THE PREFERRED EMBODIMENTS

Figure 2A:
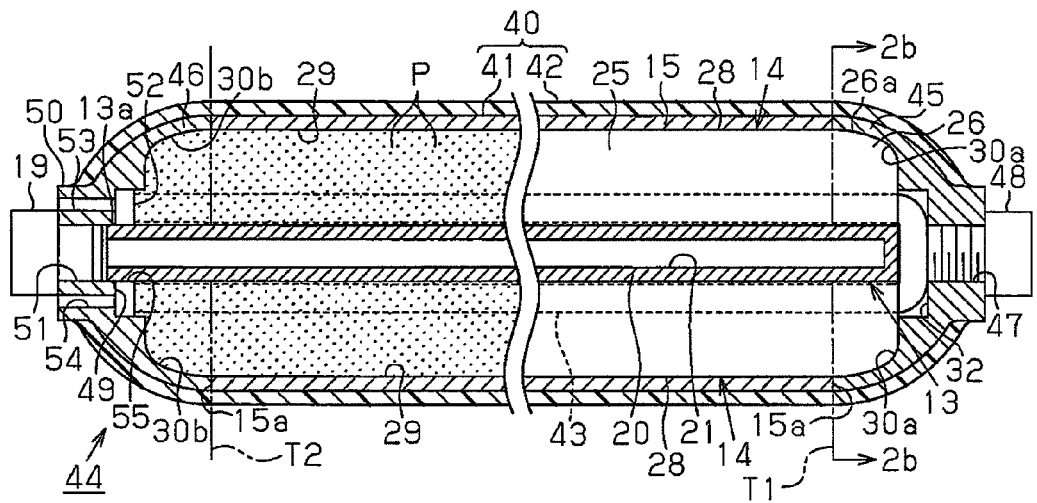
FIG. 2(a) is a schematic cross-sectional view illustrating a hydrogen storage tank according to a second embodiment of the present invention.

A first embodiment of the present invention will now be described with reference to FIGS. 1(a) to 1(c). A hydrogen storage tank that is not filled with MH powder P is shown on the right side of FIG. 1(a), and the hydrogen storage tank that is filled with the MH powder P is shown on the left side of FIG. 1(a).

As shown in FIGS. 1(a) and 1(b), the hydrogen storage tank 11 includes a substantially cylindrical tank main body 12 having sealable dome-shaped ends, a hydrogen flow pipe 13, which extends in the tank main body 12, and fins 14 provided in the tank main body 12. The term "sealable" means that the interior of the tank main body is permitted to be a sealed space by attaching a member such as a valve to the tank main body. The hydrogen flow pipe 13 extends straight along substantially the entire length of the tank main body 12. The fins 14 are formed of metal plates (for example, aluminum alloy plates), and have heat conductivity.

The tank main body 12 is made of metal (for example, aluminum alloy) and has such a strength that the tank main body 12 withstands the internal pressure of the tank main body 12 when the tank main body 12 is filled with hydrogen and the internal pressure reaches a predetermined level (for example, 10 MPa). As shown in FIG. 1(a), the tank main body 12 includes a tubular body portion 15 having opening ends 15a, and two dome portions 16, 17, which are respectively joined by welding to the opening ends 15a to cover the openings of the body portion 15.

The dome portion 16 forms a first end portion of the tank main body 12, and has a non-illustrated threaded hole at the radially central portion. A non-illustrated screw is threaded in the threaded hole. The dome portion 17 located on the opposite end to the dome portion 16 with respect to the body portion 15 forms a second end portion of the tank main body 12, and has a mounting portion 22, which projects outward. The mounting portion 22 includes a hole 18, which communicates with the internal space of the dome portion 17, and a valve 19 is attached to the hole 18.

Part of the valve 19 is inserted in the hole 18, and when the port of the valve 19 is switched, the hydrogen storage tank 11 is switched between a hydrogen release state and a hydrogen fill state. The port of the valve 19 communicates with a hydrogen passage 21 of the hydrogen flow pipe 13. A non-illustrated seal ring is arranged between the valve 19 and the inner surface of the hole 18.

A hydrogen flow section, which is the hydrogen flow pipe 13 in the first embodiment, is formed of porous material and includes a tubular wall 20, which permits hydrogen to flow along the thickness direction (permeable), and the hydrogen passage 21 through which hydrogen flows. The hydrogen flow pipe 13 functions as a filter that prevents the fine powdered MH powder P to pass through, and extends from the dome portion 16 to the dome portion 17. Since one of the opposite ends of the hydrogen flow pipe 13 that is located at the first end portion of the tank main body 12 is not open, the MH powder P does not flow into the hydrogen passage 21. Also, as shown in FIG. 1(b), grooves 23 are formed in the outer circumferential surface of the hydrogen flow pipe 13. The grooves 23 are arranged at equal intervals in the circumferential direction of the hydrogen flow pipe 13. The grooves 23 extend straight along the entire length of the hydrogen flow pipe 13. First end portions 24 of the fins 14, which extend along the axial direction of the hydrogen flow pipe 13, are fitted in the grooves 23.

The fins 14 are longer than the entire length of the body portion 15 (refer to FIG. 1(a)), and are mounted on the outer circumference of the hydrogen flow pipe 13 to extend in the radial pattern. As shown in FIG. 1(c), each fin 14 includes a first partition member located in the body portion 15. In the first embodiment, the first partition member is a partition section 25. Furthermore, each fin 14 includes a second partition member, which is an extended portion 26 in the first embodiment. The extended portion 26 extends from the partition section 25 toward the dome portion 16 and is located closer to the dome portion 16 than the associated opening end 15a of the body portion 15. Furthermore, each fin 14 includes a second partition member, which is an extended portion 27 in the first embodiment. The extended portion 27 extends from the partition section 25 toward the dome portion 17 and is located closer to the dome portion 17 than the associated opening end 15a of the body portion 15.

As shown in FIG. 1(a), each partition section 25 is substantially rectangular and extends in such a manner that the longitudinal direction of the partition section 25 is parallel to the axis of the hydrogen flow pipe 13, and that the width direction of the partition section 25 extends in the radial direction of the body portion 15. A second end portion 28 of each partition section 25 abuts against the inner wall surface of the body portion 15. The partition sections 25, the body portion 15, and the hydrogen flow pipe 13 define first retaining chambers 29, which retain the MH powder P.

The extended portions 26, 27 respectively subdivide the space in the dome portions 16, 17 by equally dividing the space in the circumferential direction of the dome portions 16, 17 so that second retaining chambers 30a, 30b are formed. The MH powder P retained in the second retaining chambers 30a, 30b contacts the extended portions 26, 27. Also, arcuate second end portions 26a, 27a of the extended portions 26, 27 contact the inner wall surface of the dome portions 16, 17. Thus, the extended portions 26, 27 are thermally conductive with the MH powder P and the tank main body 12. The extended portions 26 located in the dome portion 16 have end portions, which extend in the radial direction of the dome portion 16. A gap 32 is formed between the end portions and the inner wall surface of the dome portion 16. The gap 32 communicates with the second retaining chambers 30a, and is also connected to the non-illustrated threaded hole of the dome portion 16. The second retaining chambers 30a are connected to each other via the gap 32. Each first retaining chamber 29 and the corresponding second retaining chambers 30a, 30b are connected to each other and define a single continuous chamber. The second retaining chambers 30a are spaces located closer to the gap 32 than an imaginary plane T1, which is perpendicular to the axis of the hydrogen flow pipe 13 and extends through one of the opening ends 15a of the body portion 15. The second retaining chambers 30b are spaces located closer to the valve 19 than an imaginary plane T2, which is perpendicular to the axis of the hydrogen flow pipe 13 and extends through the other opening end 15a of the body portion 15.

Furthermore, the extended portions 27 located in the dome portion 17 have end portions, which extend along the radial direction of the dome portion 17. An end wall 33 is joined by welding to the end portions. The hydrogen flow pipe 13 is inserted in a through hole 34 formed in the end wall 33.

A method of manufacturing the hydrogen storage tank 11 will now be described.

The first end portions 24 of the fins 14 are first fitted in all the grooves 23 formed in the hydrogen flow pipe 13 to attach the fins 14 to the hydrogen flow pipe 13. Then, after inserting the hydrogen flow pipe 13 in the through hole 34 of the end wall 33, the end wall 33 is attached by welding to the end portions of the extended portions 27.

Subsequently, the assembly including the hydrogen flow pipe 13 and the fins 14 is inserted in the body portion 15. At this time, the end portions of the hydrogen flow pipe 13 and the extended portions 26, 27 are arranged to project outward from the opening ends 15a of the body portion 15. Furthermore, the dome portion 16 is joined by welding to the opening end 15a of the body portion 15 so that the extended portions 26 are arranged in the dome portion 16, and the dome portion 17 is joined by welding to the opening end 15a of the body portion 15 so that the extended portions 27 are arranged in the dome portion 17.

With the dome portion 17 being arranged at the bottom, a tubular part of a funnel-like filling jig is inserted in the non-illustrated threaded hole formed in the dome portion 16. The hydrogen storage tank 11 is filled with the MH powder P via the filling jig. The MH powder P supplied through the threaded hole enters the second retaining chambers 30a via the gap 32, and fills the first retaining chambers 29 and the second retaining chambers 30a, 30b connected to the first retaining chambers 29. After all the first retaining chambers 29 and the second retaining chambers 30a, 30b are filled with the MH powder P, the filling jig is removed, and a non-illustrated screw is threaded in the threaded hole. This completes the filling of the MH powder P. The valve 19 is then attached to the hole 18, and the manufacture of the hydrogen storage tank 11 is completed.

A case in which the hydrogen storage tank 11 configured as described above is used in a fuel cell electric vehicle will now be described.

The hydrogen storage tank 11 is transversely arranged in a non-illustrated tubular housing. A non-illustrated heat medium passage, through which heat medium (for example, water, oil, and engine coolant) flows, is formed in the inner circumferential surface of the housing. When the hydrogen storage tank 11 is arranged in the housing, the heat medium that flows through the heat medium passage contacts the outer circumferential surface of the tank main body 12. Then, the housing, in which the hydrogen storage tank 11 is arranged, is mounted on the fuel cell electric vehicle so that the hydrogen storage tank 11 is installed in the fuel-cell vehicle.

When the hydrogen storage tank 11 supplies hydrogen to a fuel electrode serving as a hydrogen supply destination, the valve 19 is switched to a hydrogen release state, and hydrogen is released from the hydrogen storage tank 11. The hydrogen released from the hydrogen storage tank 11 is supplied to the fuel electrode through a non-illustrated pipe connected to the valve 19. When the hydrogen is released from the hydrogen storage tank 11, the equilibrium between the hydrogen storage reaction and the hydrogen release reaction of the MH powder P shifts toward the release side, and the hydrogen is released from the MH powder P. Since such release of hydrogen is an endothermic reaction, if heat necessary for the release of hydrogen is not supplied by the heat medium, the MH powder P releases the hydrogen by consuming sensible heat, and the temperature of the MH powder P decreases. However, heat exchange between the hydrogen storage tank 11 and the heat medium is caused by supplying heat medium of a predetermined temperature through the heat medium passage. This heats the MH powder P to a predetermined temperature through the tank main body 12 and the fins 14, and the hydrogen release reaction thus progresses smoothly.

The MH powder P received in the first retaining chambers 29 and the second retaining chambers 30a, 30b releases hydrogen along the entire longitudinal direction of the hydrogen storage tank 11. The released hydrogen is sent to the hydrogen passage 21 through fine holes of the tubular wall 20, released from the hydrogen passage 21 via the valve 19 to the exterior of the hydrogen storage tank 11, and supplied to the fuel electrode. The temperature of the MH powder P is maintained at such a value that the hydrogen release reaction progresses smoothly by adjusting the temperature or the flow rate of the heat medium. As a result, the release of the hydrogen is carried out efficiently in such a manner as to release the amount of the hydrogen corresponding to the amount of the hydrogen necessary for the fuel cell. Since the MH powder P is retained not only in the first retaining chambers 29 but also in the second retaining chambers 30a, 30b in the dome portions 16, 17, the amount of the MH powder P in the hydrogen storage tank 11 is increased as compared to a case in which the MH powder P is retained by only the retaining chambers formed in the body portion of the tank main body. This increases the amount of hydrogen that the tank 11 can receive. That is, the proportion of the region that can be filled with hydrogen (the MH powder P) among the entire internal region of the hydrogen storage tank 11 is increased. Thus, the hydrogen storage tank 11 of the first embodiment supplies the amount of hydrogen corresponding to the amount of hydrogen necessary for the fuel cell while the fuel-cell vehicle continuously travels a longer distance as compared to a case where the conventional hydrogen storage tank is used.

To refill the hydrogen storage tank 11 with hydrogen, or, specifically, to allow the MH powder P to store hydrogen, after the hydrogen storage tank 11 has released hydrogen, the valve 19 is switched to the hydrogen fill state and the hydrogen is introduced from the valve 19 to the hydrogen passage 21 of the hydrogen flow pipe 13. After entering the hydrogen passage 21, the hydrogen flows along the entire longitudinal direction of the hydrogen storage tank 11, and passes through the fine holes of the tubular wall 20 and reaches the first retaining chambers 29 and the second retaining chambers 30a, 30b. Thereafter, the hydrogen reacts with the MH powder P in the first retaining chambers 29 and the second retaining chambers 30a, 30b to form a hydride. In this manner, the hydrogen is stored by the MH powder P. The hydrogen is continuously supplied to the MH powder P until the pressure in the hydrogen storage tank 11 reaches a predetermined pressure (for example, 10 MPa). The amount of hydrogen that the hydrogen storage tank 11 can receive is increased by an amount corresponding to the amount of the MH powder P retained in the second retaining chambers 30a, 30b. Thus, an increased amount of hydrogen is stored by the MH powder P.

Being an exothermic reaction, the hydrogen storage cannot be carried out smoothly if the heat generated by such reaction is not removed. However, when the hydrogen storage tank 11 is filled with hydrogen, heat exchange is caused between the heat medium and the hydrogen storage tank 11 by supplying heat medium at a low temperature to the heat medium passage. At this time, the heat generated by the MH powder P is absorbed by the heat medium through the tank main body 12 and the fins 14, and sent to the exterior of the hydrogen storage tank 11. This maintains the temperature of the MH powder P at such a level that the hydrogen storage progresses smoothly, and the hydrogen storage is efficiently carried out.

Since the MH powder P in the dome portions 16, 17 is separately retained by the second retaining chambers 30a, 30b, even if the MH powder P settles, the MH powder P is only collected at the bottom of each of the second retaining chambers 30a, 30b. Thus, the entire MH powder P retained in the dome portions 16, 17 does not concentrate and become compacted at the bottom of the dome portions 16, 17. Thus, even if the MH powder P absorbs the hydrogen and expands, the dome portions 16, 17 are prevented from being damaged by an excessive stress locally generated at the bottom of the dome portions 16, 17. The hydrogen flow pipe 13 functions as a filter with respect to the MH powder P. Thus, even if the MH powder P retained in the first retaining chambers 29 and the second retaining chambers 30a, 30b becomes fine powder, the fine MH powder P is prevented from leaking to the exterior of the hydrogen storage tank 11. Also, the MH powder P retained in each of the first retaining chambers 29 is prevented from moving to another one of the first retaining chambers 29 and to the second retaining chambers 30a, 30b connected to that one of the first retaining chambers 29. Similarly, the MH powder P retained in each of the second retaining chambers 30a, 30b is prevented from moving to another one of the second retaining chambers 30a, 30b and to the first retaining chambers 29 connected to that one of the second retaining chambers 30a, 30b.

The first embodiment has the following advantages.

(1) The second partition members, which are the extended portions 26, 27 in the first embodiment, are provided in the dome portions 16, 17 of the hydrogen storage tank 11. The extended portions 26, 27 divide the space in the dome portions 16, 17 into the second retaining chambers 30a, 30b. Thus, although the second retaining chambers 30a, 30b formed in the dome portions 16, 17 are filled with the MH powder P, the MH powder P is prevented from settling and compacting at the bottom of the dome portions 16, 17.

(2) The second retaining chambers 30a, 30b defined in the dome portions 16, 17 are filled with the MH powder P. Thus, the amount of the MH powder P that the hydrogen storage tank 11 can be filled with is increased by the amount corresponding to the amount of the MH powder P filling the second retaining chambers 30a, 30b. This increases the proportion of the hydrogen filled region in the hydrogen storage tank 11.

(3) The second partition members, which are the extended portions 26, 27 in the first embodiment, are integrally formed with the first partition members, which are the partition sections 25 in the first embodiment. Thus, it is not necessary to join the first partition members to the second partition members, or to mount the second partition members in the dome portions 16, 17. This facilitates the manufacture of the hydrogen storage tank.

(4) The hydrogen storage tank 11 is used in a state where heat exchange can be performed with the heat medium flowing through the heat medium passage. Therefore, when using the hydrogen storage tank 11, the MH powder P retained in the hydrogen storage tank 11 is heated and cooled by the heat medium. Thus, releasing and storing of the hydrogen by the MH powder P are efficiently performed.

(5) The hydrogen flow pipe 13 is formed of porous material and includes the tubular wall 20, through which hydrogen flows along the thickness direction, and the hydrogen passage 21, through which hydrogen flows. The outer circumferential surface of the hydrogen flow pipe 13 faces the first retaining chambers 29 and the second retaining chambers 30a, 30b. Therefore, the hydrogen flow pipe 13 permits the hydrogen released from the MH powder P to flow to the port of the valve 19, and prevents the MH powder P stored in the first retaining chambers 29 and the second retaining chambers 30a, 30b from leaking outside.

(6) The fins 14 divide the space in the tank main body 12 in the circumferential direction so that the first retaining chambers 29 and the second retaining chambers 30a, 30b are formed. The outer circumferential surface of the hydrogen flow pipe 13 faces the first retaining chambers 29 and the second retaining chambers 30a, 30b. Thus, the MH powder P retained in each of the first retaining chambers 29 is prevented from moving to another one of the first retaining chambers 29 and to the second retaining chambers 30a, 30b connected to that one of the first retaining chambers 29. Similarly, the MH powder P retained in each of the second retaining chambers 30a, 30b is prevented from moving to the another one of the second retaining chambers 30a, 30b and to the first retaining chambers 29 connected to that one of the second retaining chambers 30a, 30b.

A second embodiment of the present invention will be described with reference to FIGS. 2(a) and 2(b). A hydrogen storage tank 44 that is not filled with the MH powder P is shown on the right side of FIG. 2(a), and the hydrogen storage tank 44 that is filled with the MH powder P is shown on the left side of FIG. 2(a). The second embodiment mainly differs from the first embodiment in that a tank main body 40 includes a metal liner 41 and a fiber-reinforced resin layer 42, which is formed outside the liner 41, so as to form a two-layer structure, and that heat medium lines 43 are located in the tank main body 40. Like or the same reference numerals are given to those components that are like or the same as the corresponding components of the first embodiment and detailed explanations are omitted.

As shown in FIG. 2(a), the tank main body 40 is formed into an elongated hollow shape, and includes the liner 41 having dome-shaped ends and the fiber-reinforced resin layer 42, which covers substantially the entire outer surface of the liner 41.

The liner 41 is formed of, for example, aluminum alloy, and secures airtightness of the hydrogen storage tank 44. The liner 41 includes the body portion 15 and dome portions 45, 46, which are respectively joined to the opening ends 15a of the body portion 15.

The fiber-reinforced resin layer 42 is carbon fiber reinforced plastic (CFRP) that uses carbon fiber as the reinforcement fiber in the second embodiment. The fiber-reinforced resin layer 42 covers the outer surface of the body portion 15 and the dome portions 45, 46 to secure pressure resistance of the hydrogen storage tank 44. The fiber-reinforced resin layer 42 is formed by, for example, wrapping a carbon fiber bundle impregnated with resin such as an unsaturated polyester resin or an epoxy resin around the tank main body 40 to form a helical winding layer and a hoop winding layer, and then thermally curing the resin.

An MH inlet hole 47 is provided at the radially central portion of the dome portion 45 forming the first end portion of the tank main body 40, and a screw 48 is threaded to the MH inlet hole 47. A columnar recess 49 is formed in the inner wall of the dome portion 46 forming the second end portion of the tank main body 40. A mounting portion 50, which projects outward, is also formed on the dome portion 46. The mounting portion 50 includes a hole 51, which is open to the outside.

A substantially annular header portion (mounting portion) 52 for mounting the heat medium lines 43, through which the heat medium flows, to the dome portion 46 is fitted and secured to the recess 49. A non-illustrated seal ring is arranged between the circumferential surface of the recess 49 and the outer circumferential surface of the header portion 52. This prevents the MH powder P retained in the first retaining chambers 29 and the second retaining chambers 30a, 30b from leaking from between the header portion 52 and the recess 49.

The header portion 52 includes a non-illustrated passage, which connects the upstream end portion of each heat medium line 43 to a path 53 formed in the mounting portion 50, and a non-illustrated passage, which connects the downstream end portion of each heat medium line 43 to a path 54 formed in the mounting portion 50. Furthermore, the header portion 52 includes a hole 55 through which the hydrogen flow pipe 13 extends. The hydrogen flow pipe 13 is inserted in the hole 55, and a hydrogen outlet 13a of the hydrogen flow pipe 13 is fitted in the hole 51. A non-illustrated seal ring is arranged between the inner circumferential surface of the header portion 52 and the outer circumferential surface of the hydrogen flow pipe 13. A plurality of (in the second embodiment, two) heat medium lines 43 are provided by securing the end portions of the heat medium lines 43 to the header portion 52, for example, by brazing or welding.

Figure 2B:
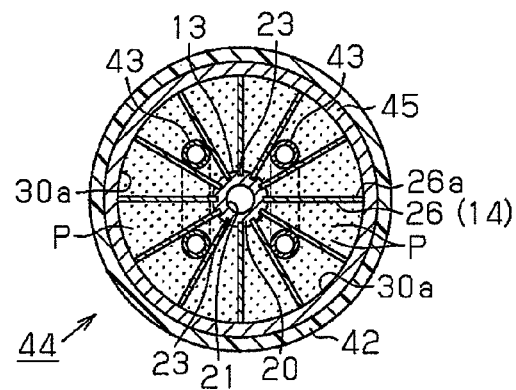
FIG. 2(b) is a cross-sectional view taken along line 2b-2b in FIG. 2(a)

As shown in FIGS. 2(a) and 2(b), each heat medium line 43 extends from the second end portion of the tank main body 40 through one of the first retaining chambers 29 and the corresponding second retaining chambers 30a, 30b, and reaches the first end portion of the tank main body 40. Each heat medium line 43 then curves to form a substantially U-shape, and returns to the second end portion of the tank main body 40. The heat medium lines 43 extend along the entire longitudinal direction of the tank main body 40, and contact part of the fins 14 defining the first retaining chambers 29 and the second retaining chambers 30a, 30b. That is, part of each heat medium line 43 that extends from the second end portion of the tank main body 40 to the first end portion of the tank main body 40 and part of the heat medium line 43 that extends from the first end portion of the tank main body 40 to the second end portion of the tank main body 40 respectively contact two fins 14. The two fins 14 that the part of each heat medium line 43 extending from the second end portion of the tank main body 40 to the first end portion of the tank main body 40 contacts are different from the two fins 14 that the part of the heat medium line 43 extending from the first end portion of the tank main body 40 to the second end portion of the tank main body 40 contacts.

As shown in FIG. 2(a), a pipe that is connected to a non-illustrated heat medium supply portion is connected to the path 53 formed in the mounting portion 50, and a pipe that communicates with a non-illustrated heat medium outlet portion is connected to the path 54. The heat medium, which is water (cold water or heated water) in the second embodiment, is supplied to the heat medium lines 43 from the heat medium supply portion through the path 53. According to the second embodiment, the path 53 is located at the upstream section and the path 54 is located at the downstream section in the flow direction of the heat medium. When the heated water is supplied to the heat medium lines 43 from the path 53, the MH powder P retained in the first retaining chambers 29 and the second retaining chambers 30a, 30b through which the heat medium lines 43 extend is directly heated by the heat medium lines 43. The MH powder P retained in the first retaining chambers 29 and the second retaining chambers 30a, 30b through which the heat medium lines 43 do not extend is heated by the heat medium via the fins 14 and the liner 41. Also, when cold water is supplied to the heat medium lines 43 from the path 53, the MH powder P retained in the first retaining chambers 29 and the second retaining chambers 30a, 30b through which the heat medium lines 43 extend is directly cooled by the heat medium lines 43. The MH powder P retained in the first retaining chambers 29 and the second retaining chambers 30a, 30b through which the heat medium lines 43 do not extend is cooled by the heat medium via the fins 14 and the liner 41.

A method of manufacturing the hydrogen storage tank 44 will now be described.

To manufacture the hydrogen storage tank 44, the dome portion 46 to which the header portion 52 is fitted and secured is first prepared, and the end portions of the heat medium lines 43 are joined to the header portion 52 by brazing or welding. After inserting through the hole 55, the hydrogen flow pipe 13 is engaged with the hole 51. The fins 14 are then mounted about the hydrogen flow pipe 13. Subsequently, the assembly including the fins 14 and the hydrogen flow pipe 13 is arranged in the body portion 15, and one of the opening ends 15a of the body portion 15 is joined by welding to the dome portion 46. Furthermore, the other one of the opening ends 15a is joined by welding to the dome portion 45.

Then, the liner 41, in which the fins 14, the hydrogen flow pipe 13, and the heat medium lines 43 are arranged, is mounted on a filament winding apparatus (not shown). A resin-impregnated fiber bundle is wound around the outer surface of the liner 41 until a predetermined number of helical winding layers and hoop winding layers are formed by performing filament winding. Then, the liner 41 around which the resin-impregnated fiber bundle is wound is removed from the filament winding apparatus, and put in the heating furnace to heat and harden the resin. In this manner, the tank main body 40 is produced.

Thereafter, with the dome portion 46 being arranged at to the bottom, the tubular part of the funnel-like filling jig is inserted in the MH inlet hole 47. The hydrogen storage tank 44 is filled with the MH powder P via the filling jig. The MH powder P supplied through the MH inlet hole 47 fills the first retaining chambers 29 and the second retaining chambers 30a, 30b. Then, after all the first retaining chambers 29 and the second retaining chambers 30a, 30b are filled with the MH powder P, the filling jig is removed. The screw 48 is threaded to the MH inlet hole 47 and the filling with the MH powder P is completed. The valve 19 is then attached to the hole 51, and the manufacture of the hydrogen storage tank 44 is completed.

The second embodiment has the following advantages.

(7) The tank main body has the two-layer structure including the metal liner 41 and the fiber-reinforced resin layer 42, which is formed on the outside of the liner 41. Therefore, when the weight of the hydrogen storage tank is the same, the pressure resistance of the hydrogen storage tank 44 is improved as compared to a hydrogen storage tank of which the outer shell is formed of only the metal tank main body. Thus, the hydrogen storage tank 44 can be filled with hydrogen at high pressure, thereby increasing the amount of hydrogen that can be used to fill the hydrogen storage tank 44.

The present invention is not restricted to the illustrated embodiments but may be embodied in the following forms.

In the second embodiment, the shape of the partition members may be modified. For example, as the first partition members and the second partition members, substantially disk-like fins may be arranged along the axial direction of the hydrogen flow pipe 13 at equal intervals, and may be secured to the hydrogen flow pipe 13 and the heat medium line 43. In this case, the diameter of the fins arranged in the dome portion 45 decreases toward the screw 48, and the diameter of the fins arranged in the dome portion 46 decreases toward the valve 19. With this structure, the space in the body portion 15 is divided into the first retaining chambers by the disk-like fins, and the spaces in the dome portions 45, 46 are divided into the second retaining chambers by the disk-like fins. However, if the distance between the fins is increased and the volume of the first retaining chambers or the second retaining chambers is increased, a large amount of the MH powder might settle at the bottom portion and might partially be compacted. Thus, the distance between the fins needs to be set in such a manner that even if the MH powder settles at the bottom portion, the MH powder is not partially compacted. With this structure, a tubular filter that prevents the MH powder to pass through and permits hydrogen to permeate may be provided between the inner wall surface of the body portion 15 and the fins to surround the fins.

In the second embodiment, the reinforcement fiber forming the fiber-reinforced resin layer 42 does not need to be carbon fiber. Instead, other fiber that generally has high elasticity and high strength, such as silicon carbide ceramic fiber and aramid fiber, may be used as the reinforcement fiber.

In the second embodiment, the number of the heat medium lines 43 arranged in the tank main body 40 does not need to be two. The number of the heat medium lines 43 is not particularly restricted and may be any number such as one or more than two.

Figure 3A:
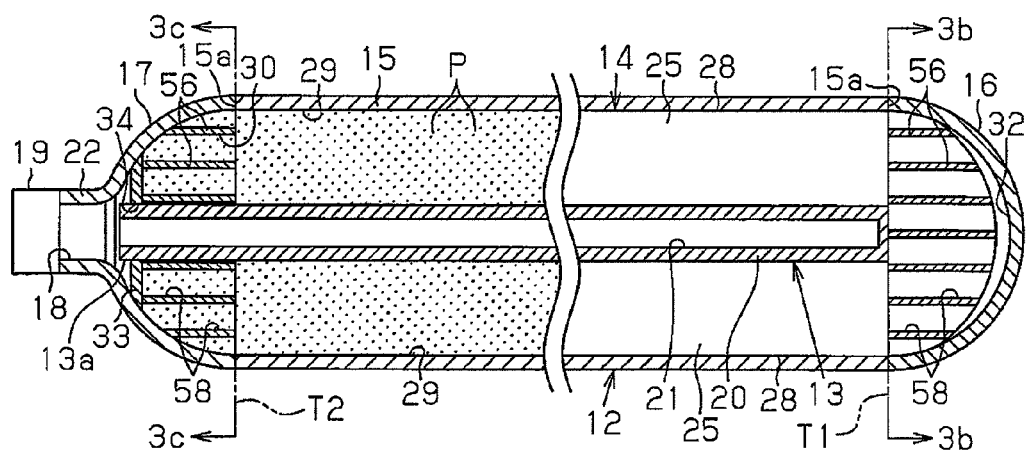
FIG. 3(a) is a schematic cross-sectional view illustrating a hydrogen storage tank according to a modified embodiment of the present invention.
Figure 3B:
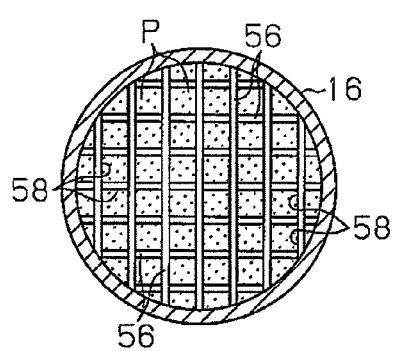
FIG. 3(b) is a cross-sectional view taken along line 3b-3b in FIG. 3(a)
Figure 3C:
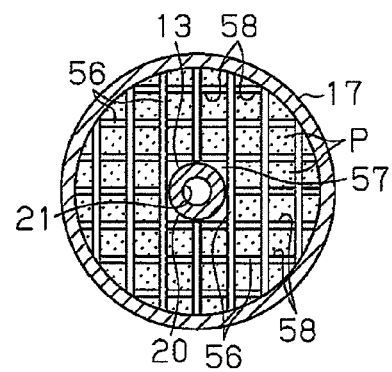
FIG. 3(c) is a cross-sectional view taken along line 3c-3c in FIG. 3(a)
Figure 4:
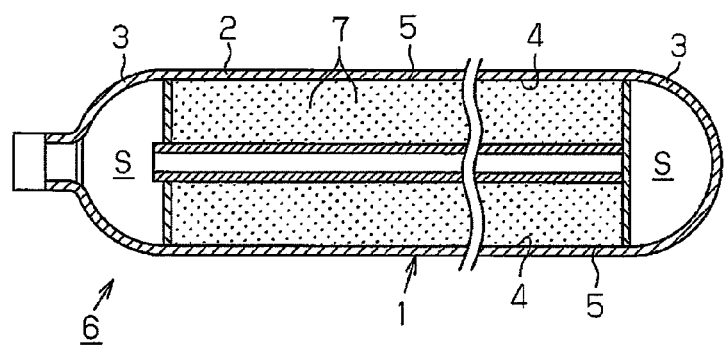
FIG. 4 is a schematic cross-sectional view illustrating a conventional hydrogen storage tank.

The structure of the second partition members provided in the dome portions 16, 17 may be modified. For example, second partition members 56 that are separate members from the partition sections 25 and have a grid-like cross-section may be provided in the dome portions 16, 17 as shown in FIGS. 3(a) and 3(b). A region 57 that permits the hydrogen flow pipe 13 to extend through is provided in the second partition member 56 in the dome portion 17 as shown in FIG. 3(c). The hydrogen flow pipe 13 extends through the region 57, and the hydrogen outlet 13a extends to the vicinity of the hole 18. In this manner, when the second partition members 56 are formed to have a grid-like cross-section, many second retaining chambers 58 having a small volume are easily formed. This further prevents the MH powder P from being compacted. Also, hydrogen released from the MH powder P retained in the second retaining chambers 58 flows from the first retaining chambers 29 into the hydrogen passage 21 of the hydrogen flow pipe 13.

In FIGS. 3(a) to 3(c), the second retaining chambers having rectangular cross-section are shown, but the cross-section of the second retaining chambers may be a polygon other than a rectangle. For example, various kinds of shape such as a honeycomb (hexagon) or an octagon may be employed. The cross-section of the second partition members may be formed into a grid-like shape corresponding to the shape of the second retaining chambers. That is, in this specification, the terms "grid-like" and "grid-like shape" refer to the cross-section of the second partition member that can form the second retaining chambers having a polygonal cross-section. The cross-section is not limited to the cross-section of the second partition members shown in FIG. 3.

Instead of using the extended portions 26, 27, which extend from the partition sections 25 to the dome portions 16, 17, as the second partition members, the partition sections 25 and the second partition members may be separately formed. For example, plates that are separate from the partition sections 25 and engageable with the grooves 23 formed on the outer circumferential surface of the hydrogen flow pipe 13, and that can be arranged in the dome portions 16, 17 may be used as the second partition members. In this case, the second retaining chambers are defined by the second partition members formed of plates by arranging the second partition members attached to the hydrogen flow pipe 13 in the dome portions 16, 17.

Instead of forming the tank main body 12 by joining the dome portions 16, 17 to the body portion 15 by welding, the tank main body that integrally has the dome portions on opposite ends may be formed by drawing. In this case, a tubular tank main body having openings on opposite ends is prepared. After mounting the fins having the same length as the entire length of the body portion 15 to the hydrogen flow pipe 13, the grid-like second partition members are attached to the ends of the fins in the axial direction of the hydrogen flow pipe 13. The end wall 33 is then joined to the second partition member on one end. Subsequently, after the first end portion of the tank main body is formed by drawing, the hydrogen flow pipe 13, the fins 14, the second partition members, and the end wall 33 are arranged in the tank main body. Thereafter, the second end portion of the tank main body is formed by drawing. Then, a threaded hole is formed in the first end portion of the tank main body. The MH powder P is supplied via the threaded hole to fill the first retaining chambers 29 and the second retaining chambers 30a, 30b. Finally, the valve 19 is attached to the hole 18 formed in the second end portion of the tank main body 12 so that the manufacture of the hydrogen storage tank is completed.

In the tank main body 12 including the dome portions respectively located at the first end portion and the second end portion, the second partition member may be arranged in only one of the dome portions. For example, the second partition member may be provided in only the dome portion 16 forming the first end portion if there is no space for providing the second partition member in the dome portion 17 since a valve for switching the state of the hydrogen storage tank 11 is provided in the dome portion 17 forming the second end portion.

The shape of the body portion 15 may be modified. The body portion may be any shape as long as it is hollow and the opposite ends are open. Thus, for example, the body portion may be formed into a tubular shape having curved outer circumferential surface, or may be formed into a rectangular cylinder.

The shape of the tank main body 12 may be modified. For example, instead of forming the dome portion on the first end portion of the tank main body 12, the shape of the first end portion of the tank main body 12 may be flat. In this case, the dome portion is formed only on the second end portion of the tank main body 12.

The metal used for forming the tank main body 12 does not need to be aluminum alloy, but may be iron or copper.

The hydrogen storage tank 11 does not need to be used as a hydrogen source of the fuel cell electric vehicle, but may be applied to, for example, a hydrogen source of a hydrogen engine or a heat pump. Also, the hydrogen storage tank 11 may be used as a hydrogen source of a fuel cell of a domestic power supply.

The invention claimed is:

1. A hydrogen storage tank comprising:
   a sealable tank main body including a hollow body portion having openings on opposite ends and first and second end portions, which are provided on the opposite ends of the body portion, respectively, at least one of the first and second end portions being formed as a dome portion;
   hydrogen absorbing metal retained in the body portion and the dome portion;
   a first partition member located in the body portion, the first partition member dividing the space in the body portion into a plurality of first retaining chambers retaining the hydrogen absorbing metal;
   a second partition member located in the dome portion, the second partition member dividing the space in the dome portion into a plurality of second retaining chambers separately retaining the hydrogen absorbing metal; and
   a hydrogen flow section located in the tank main body, the hydrogen flow section having a tubular wall that prevents the hydrogen absorbing metal from passing through the tubular wall and permits hydrogen to flow through the tubular wall, and the hydrogen flow section permitting hydrogen to flow between the inside and the outside of the tank main body.

2. The hydrogen storage tank according to claim 1, wherein the second partition member extends from the first partition member into the dome portion.

3. The hydrogen storage tank according to claim 2, wherein the second partition member is formed integrally with the first partition member.

4. The hydrogen storage tank according to claim 1, wherein the hydrogen flow section extends in the tank main body along the axis of the tank main body, and the first and second partition members include a plurality of fins attached to the hydrogen flow section to extend in a radial pattern.

5. The hydrogen storage tank according to claim 1, wherein the second partition member is a separate member from the first partition member, and the second partition member has a grid-like cross-section.

6. The hydrogen storage tank according to claim 1, wherein the tank main body includes a hollow metal liner and a fiber reinforced resin layer that covers the liner.

7. The hydrogen storage tank according to claim 2, wherein the tank main body includes a hollow metal liner and a fiber reinforced resin layer that covers the liner.

8. The hydrogen storage tank according to claim 3, wherein the tank main body includes a hollow metal liner and a fiber reinforced resin layer that covers the liner.

9. The hydrogen storage tank according to claim 4, wherein the tank main body includes a hollow metal liner and a fiber reinforced resin layer that covers the liner.

10. The hydrogen storage tank according to claim 5, wherein the tank main body includes a hollow metal liner and a fiber reinforced resin layer that covers the liner.

* * * * *